United States Patent
Newman, Jr.

[11] 3,860,036
[45] Jan. 14, 1975

[54] VARIABLE GEOMETRY FEED BLOCK FOR MULTILAYER EXTRUSION

[75] Inventor: Ritchey O. Newman, Jr., Midland, Mich.

[73] Assignee: The Dow Chemical Company, Midland, Mich.

[22] Filed: Nov. 6, 1972

[21] Appl. No.: 304,262

Related U.S. Application Data

[63] Continuation-in-part of Ser. No. 85,860, Nov. 2, 1970, abandoned.

[52] U.S. Cl. .................... 138/45, 138/46, 425/131, 425/197
[51] Int. Cl. ............................................. F15d 1/00
[58] Field of Search .......... 138/45, 46, 43; 251/120; 425/131, 197, 466

[56] References Cited
UNITED STATES PATENTS
| | | | |
|---|---|---|---|
| 1,715,859 | 6/1929 | Norton | 425/466 |
| 3,254,368 | 6/1966 | Kullgren et al. | 138/43 X |
| 3,611,492 | 10/1971 | Scheibling | 425/131 |

*Primary Examiner*—Charles A. Ruehl
*Attorney, Agent, or Firm*—William M. Yates; Robert W. Selby; Lloyd S. Jowanovitz

[57] ABSTRACT

A device and method is described for forming a thermoplastic material into a predetermined layer configuration. The device comprises a body which defines a passage having inlet and outlet ports on opposite sides of the body. A flexible wall portion separates the passage from a cavity within the body. An adjusting means is in operational combination with the flexible wall portion to flex said wall to vary the cross-sectional configuration of the passage.

8 Claims, 5 Drawing Figures

PATENTED JAN 14 1975

VARIABLE GEOMETRY FEED BLOCK FOR MULTILAYER EXTRUSION

BACKGROUND OF THE INVENTION

The present application is a continuation-in-part of my previous application Ser. No. 85,860 filed Nov. 2, 1970 and now abandoned.

This invention pertains to plastic article shaping and more particularly to continuously forming thermoplastic compositions of a particular cross-section.

It is oftentimes desired to prepare extrudable resinous or thermoplastic film and sheet in a laminar fashion to provide the desired characteristics. This has previously been accomplished by supplying a hot thermoplastic material to a feeder die to form the individual layers of a final laminated structure. From the feeder die or feed block the layers passed to an extrusion die to form the multilayer combination of plastic substance into the final configuration, such as film or sheet.

In general, the use of feed blocks to form such multilayer structures is dependent upon the laminar flow characteristics being maintained from the feed block passage to a die orifice. Oftentimes, the layer width increases by a factor of 20 or 30 between the feed block and die. This increase in width can cause the layers of plastified resinous film to vary in thickness. Undesirable differences in thickness of the layer or layers within the final structure of the composite or stratified combination of thermoplastic material frequently result from a thickness variation in the initial thermoplastic stream.

It is, therefore, an object of this invention to provide a method of forming resinous streams into a multilayer structure of desired configuration.

It is another object of this invention to provide a device capable of varying the geometry of the cross-section of extruded thermoplastic layers.

Other objects and advantages will become apparent during the course of the following description.

SUMMARY OF THE INVENTION

The above objects and advantages have been achieved in a device comprising a body having generally opposite first and second sides, said body defining: at least one passage having an inlet port in the first side, an outlet port in the second side and at least one flexible wall portion; at least one cavity adjacent to and spaced apart from the passage by the flexible wall portion, and at least one adjusting means in operational combination with the flexible wall portion to flex the wall portion by application of a leverage producing force to vary the cross-sectional configuration of the passage.

The aforementioned device can be beneficially utilized in a method comprising supplying resinous materials in heat plastified states, transferring the plastified resinous materials to such device, passing the resinous materials through the adjustable passage, and then extruding the elongated resinous material through an extrusion die to form structures of a predetermined layer configuration. Optionally, the resinous materials can be passed through the adjustable passage and the cavity simultaneously before extruding the elongated resinous material through an extrusion die to form multilayered structures of a predetermined layer configuration. This method encompasses extrusion of a single resinous composition or more desirably at least two dissimilar heat plastified resinous substances. The resinous substances can be dissimilar in chemical composition, physical properties, and/or appearance.

DESCRIPTION OF THE DRAWING

The accompanying drawings further illustrate the invention.

DESCRIPTION OF THE PREFERRED EMBODIMENTS

Figure 1:
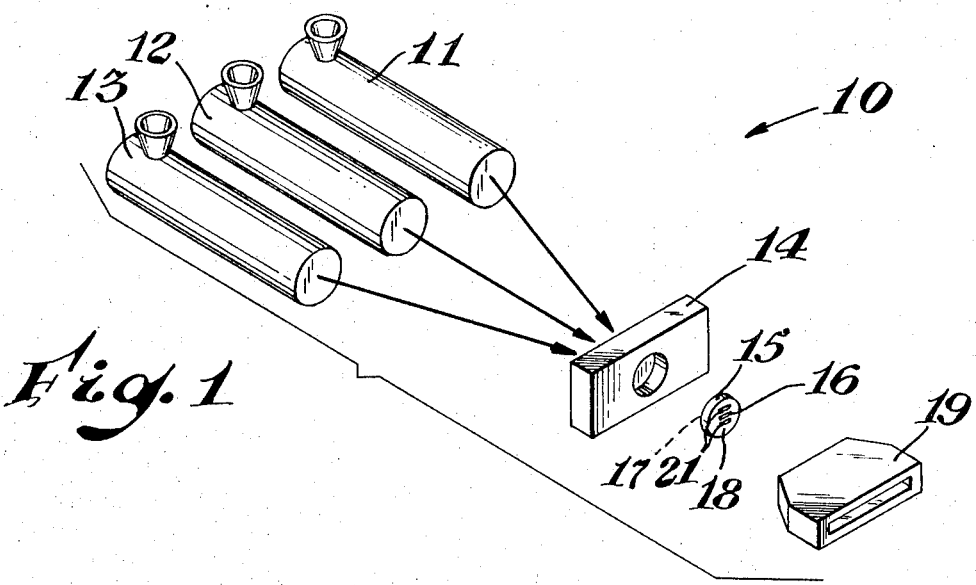
FIG. 1 is a schematic representation of the method and apparatus of the invention.

In FIG. 1 there is schematically depicted a basic apparatus 10 in accordance with the invention. The apparatus 10 comprises in cooperative combination a first source of heat plasticized, thermoplastic resinous material 11, and, second and third sources, 12 and 13, of resinous materials. A holder member 14 provides an opening for insertion of a body 15, which includes therein a passage 16 of variable geometric cross-section through which the plastified thermoplastic resin flows into a stream of a desired configuration. The passage 16 extends through the body 15 from a first side 17 to a second side 18.

To minimize turbulent flow from the body 15 to an extrusion die 19, an adaptor (not shown) can, optionally, be positioned between the body and the die to direct the resinous stream to an orifice in the die 19.

The extrusion die 19 is positioned to accept the stream formed within the passage 16 and, optionally, cavities 21 of the body 15. After the elongated resinous material passes through the body 15, the die 19 forms the material into a structure of predetermined physical arrangement. When the passage 16 and the cavities 21 are simultaneously utilized to pass a resinous material therethrough, the die 19 combines the material into a multilayered or stratified structure of predetermined physical arrangement.

The device is constructed of a structural material which is substantially chemically and physically inert to the resinous material or the process operating conditions, such as temperature and atmosphere. Preferably such structural material is a metal or alloy such as steel, nickel, and the like.

Figure 2:
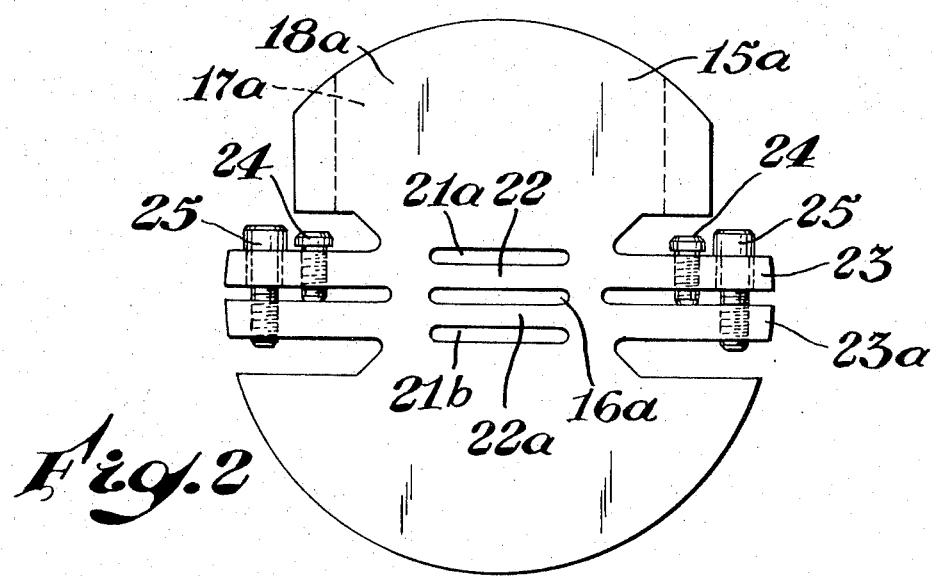
FIG. 2 is a transverse view of a feed block useful in the apparatus of FIG. 1.

FIG. 2 is illustrative of a regularly shaped body 15a defining a passage 16a and cavities 21a and 21b. The passage 16a extends from a first side 17a to a second side 18a and is spaced apart from the cavities 21a and 21b by flexible wall portions 22 and 22a. Spaced apart flanges 23 and 23a extend generally outwardly from the body 15a at a position generally adjacent to the passage 16a. Means for adjusting the configuration of the passage 16a are herein illustrated by tension bolts or screws 24 and compression bolts or screws 25, which are adpated to alter the distance between the spaced apart flanges 23 and 23a. Other means of forcibly adjusting the distance between the flanges, such as bolts, clamps, wedges, and the like, to exert a leverage producing force on at least the flexible wall portion are also acceptable.

In operation, the flexible wall portions 22 and 22a and the spaced apart flanges 23 and 23a, respectively, act as continuous levers with fulcrums situated therebetween within the body 15a. Tightening the tension screw 24 after/or simultaneously with the loosening of the compression screw 25 causes separation of the flanges 23 and 23a. Concurrently with movement of the flanges apart, the flexible wall portion 22 moves downwardly to alter the geometric configuration of the passage 16a and the cavity 21a. The flexible wall portion 22a will likewise move in upward direction thereby modifying the cross-sectional configuration of the passage 16a and simultaneously increasing the cross-sectional area of the cavity 21b.

The flexible wall portions 22 and 22a can be bent outwardly from the passage 16a to alter the cross-sectional area of the passage 16a by loosening or unscrewing the tension screw 24 and tightening the compression screw 25 in such a manner to reduce the distance between the spaced apart flanges 23 and 23a. The flexible wall portions generally will be elastically bent since the forces required for bending will normally be within the yield strength of the material from which the body is made.

Figure 3:
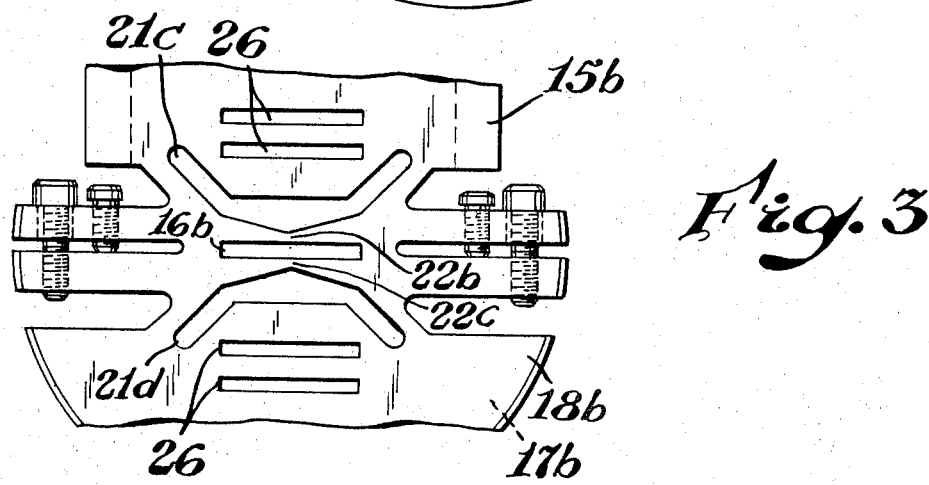
FIGS. 3, 4, and 5 are alternate embodiments of FIG. 2. Identical numerals, distinguished by a letter suffix, within the several figures represent parts having a similar function within the different embodiments.

FIG. 3 is another embodiment of the variable geometry feed block for multilayered extrusion as described in FIG. 2. In this embodiment the variable passage 16b and the fixed passages 26 extend from a first side 17b to a second side 18b. Cavities 21c and 21d are so shaped to permit maximum deflection of flexible wall portions 22b and 22c at a location equally distant between the shortest sides of the rectangularly shaped variable passage 16b. Significant deformation of the fixed passages 26 usually will not occur.

Operation of the device shown in FIG. 3 is similar to that as previously described for that in FIG. 2. In the embodiment of FIG. 3 greater deformation of the flexible wall portions 22b and 22c can be effected than is attainable in the device of FIG. 2. The general configuration of the cavities 21c and 21d results in selective bending of the flexible wall portions 22b and 22c at a position centrally located with respect to the variable passage 16b when a leverage producing force is applied to the flanges. Additionally, in this embodiment a single layer within a multiplicity of distinct layers within a thermally plastified stream is altered without significantly effecting the configuration of the remaining layers formed within the fixed passages 26.

Figure 4:
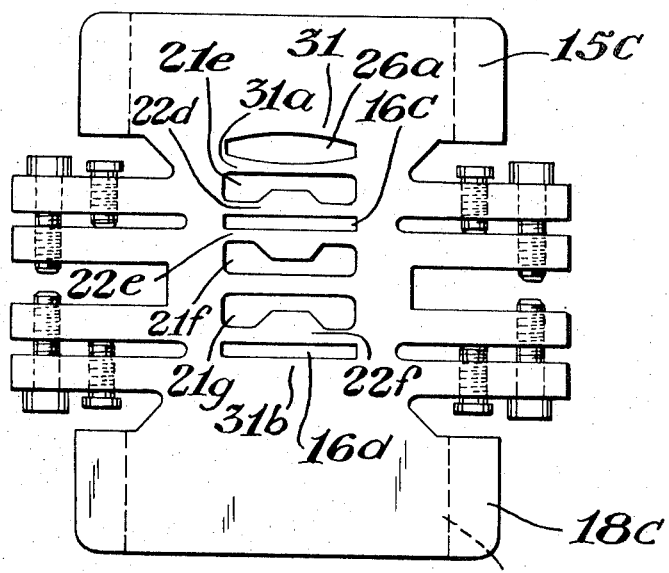

FIG. 4 depicts a basically rectangular body 15c defining two adjustable passages 16c and 16d and at least one fixed passage 26a, which extend from a first side 17c to a second side 18c of the body 15c. The body 15c further defines three irregular shaped cavities 21e, 21f, and 21g. Four sets of adjusting means are present to selectively flex the wall portions separating the aforementioned cavities and adjacent spaced apart variable passages. The cavities 21e, 21f, and 21g are adapted to afford selective deformation of flexible wall portions 22d, 22e, and 22f in accord with a different deflection curve than attainable in the embodiment of FIG. 3. Fixed wall portions 31, 31a, and 31b are adapted to maintain a uniform or stable cross-sectional configuration of the adjustable passage 16d or the fixed passage 26a. Adjustment of the passages of variable geometry in FIG. 4 is done in a manner similar to that as described in FIG. 2.

In the embodiment of FIG. 4 a stratified stream of thermally plastified material can be created having greater than one layer of variable geometry. Herein the cavity design predetermines the change in cross-sectional geometry of the plastified stream flowing through the adjustable variable passage without determining the magnitude of the change.

Through examination of FIGS. 2, 3, and 4 it will become apparent that the passages can be used in combination with cavities extending longitudinally through the body from the first side to the second side of the body. Preferably only the passages are utilized to carry and form the plastified material into a stream prior to extruding the material into a shape, such as a sheet or film in an extrusion die.

Figure 5:
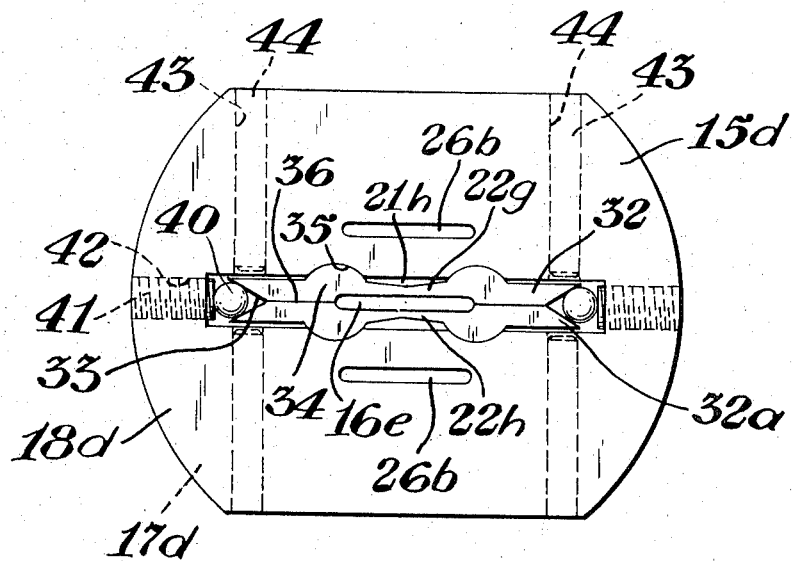

In FIG. 5, a body 15d includes at least one elongated insert 32 having first and second ends positioned within the body. At least one end of the elongated insert 32 is formed in the shape of a wedging surface 33. The elongated insert 32 additionally has at least one pivoting means or boss 34, which is generally a smooth hemispherically or hemicylindrically shaped protuberance adapted to slideably mate with a boss receptacle 35 in the body 15d. A cavity 21h is enclosed by the body 15d and a flexible wall portion 22g in the elongated insert 32. A variable passage 16e is defined by the flexible wall portion 22g and the body 15d or, optionally, a similar flexible wall portion 22h in an insert 32a. The elongated inserts 32 and 32a should be in mutual sealing engagement at a parting line 36 to prevent excessive flow therebetween of the thermally plastified materials, while such materials are being extruded through the variable or adjustable passage 16e. The variable passage 16e and the two fixed passages 26b extend from a first side 17d to a second side 18d of the body 15d.

The adjusting means of the embodiment in FIG. 5 includes a slideable pressure transmitting means or a rigid sphere 40 in mechanical contact with the wedging surface 33.

A force exerting means or rigid bolt 41 is positioned within an accepting hole or slot 42 within the body 15d. The force exerting means 41 is an operational mechanical contact with the slideable pressure transmitting means 40, which can, for example, be a spherically, cylindrically, or wedge shaped object positioned in operational contact with the wedging surface 33.

During operation, the force exerting means 41, such as a threaded bolt or screw or a piston operated member, inwardly exerts forces against the slideable transmitting means 40 which, in turn, exerts forces against the wedging surface 33 and the elongated insert 32. The inward forces within the elongated insert 32 cause the boss 34 to act as a fulcrum and rotate within the receptacle 35. The rotation of the boss 34 flexes or bends the wall portion 22g inwardly toward the passage 16e thereby varying the cross-sectional configuration of the passage. The flexible wall portion 22g will return to the original shape when the forces exerted by the force exerting means 41 are relieved, unless the yield strength of the specific material is exceeded. The configuration of the passages 26b are not significantly modified during the adjustment of the passage 16e.

A means to bend the elongated insert 32 into substantially the original shape can be useful when the forces exerted by the force exerting means 41 exceed the yield strength of the insert. A bending means or adjustable pin 43 can be positioned in a hole 44 within the body 15d. After and/or concurrently with release of pressure transmitted by the rigid sphere 40, the adjustable pin 43 can be tightened to force the insert 32 into a configuration similar to the shape it had prior to yielding.

It is additionally within the scope of this invention that the adjusting means shown in FIG. 5 be used alone or in combination with the adjusting means described in the aforementioned embodiments in FIGS. 2 through 4. An advantage of the embodiment of FIG. 5 is that the design of either/or both the variable passages and cavities can be altered by merely replacing the elongated insert 32 with an elongated member of desired shape.

A further adjusting means not depicted in the figures is one wherein the cavity is at least partially sealed and pressurized with sufficient fluid to deflect the flexible wall portion inwardly toward the variable passage. This means of adjusting is employable in combination with that of the before described embodiments.

In normal use, the feed block will frequently include a multitude of passages of both fixed and variable geometry. The resinous materials can be passed through any combination of such passages. Generally a plurality of dissimilar resinous materials will be coextruded. The instant invention does, though, include a device with a single variable geometry passage and the method within a single thermoplastic composition is extruded.

As is apparent from the foregoing specification, the device of the present invention is susceptible of being embodied with various alterations and modifications, which may differ from those described in the preceding description. For this reason it is to be fully understood that all of the foregoing is intended to be illustrative and not to be construed or interpreted as being restrictive or otherwise limiting the present invention.

What is claimed is:

1. A device comprising a body having generally opposite first and second sides, said body defining: at least one passage with an inlet port in the first side, an outlet port in the second side and at least one flexible wall portion; at least one cavity spaced apart from said passage by said flexible wall portion; and at least one adjusting means in operational combination with and spaced apart from said flexible wall portion and said cavity, said adjusting means adapted to flex said wall portion by application of a leverage producing force to vary the cross-sectional configuration of said passage.

2. The device of claim 1 including at least one adjustable elongated insert having first and second ends positioned within the body to provide said flexible wall portion, at least the first end of said insert defining a wedging surface.

3. The device of claim 2 wherein said adjusting means includes a slidable pressure transmitting means in operational combination with the wedging surface of said insert and a force exerting means in operational combination with said pressure transmitting means.

4. A feed block for multilayer extrusion of a thermoplastic resinous material comprising a metallic body having generally opposite first and second sides, said body defining at least one passage of adjustable cross-section having an inlet port in the first side, an outlet port in the second side and at least two bendable wall portions; at least two cavities spaced apart from said passage by said bendable wall portions, said cavities adapted to permit deflection of the said bendable wall portions; and at least two adjusting means in operational combination with and spaced apart from said bendable wall portions and said cavities, said adjusting means adapted to regulatably bend said bendable wall portions by application of a leverage producing force thereto to alter the cross-sectional configuration of said passage.

5. The feed block of claim 4 including at least one adjustable elongated insert having first and second ends positioned within the body to provide a bendable wall portion, at least the first end of said insert defining a wedging surface.

6. The feed block of claim 5 wherein said adjusting means includes a slidable pressure transmitting means in operational combination with the wedging surface of said insert and a force exerting means in operational combination with said pressure transmitting means.

7. A device comprising a body having generally opposite first and second sides, said body defining: at least one passage with an inlet port in the first side, an outlet port in the second side and at least one flexible wall portion; at least one cavity spaced apart from said passage by said flexible wall portion; at least two spaced apart flanges extending generally outwardly from said body at a position generally adjacent to said passage; and at least one adjusting means in operational combination with and spaced apart from said flexible wall portion, said adjusting means including at least one force exerting means adapted to alter the distance between said flanges, said adjusting means adapted to flex said wall portion by application of a leverage producing force to vary the cross-sectional configuration of said passage.

8. A feed block for multilayer extrusion of a thermoplastic resinous material comprising a metallic body having generally opposite first and second sides, said body defining at least one passage of adjustable cross-section having an inlet port in the first side, an outlet port in the second side and at least two bendable wall portions; at least two cavities spaced apart from said passage by said bendable wall portions, said cavities adapted to permit deflection of the said bendable wall portions; at least two spaced apart flanges extending generally outwardly from said body at a position generally adjacent to said passage; and at least two adjusting means in operational combination with and spaced apart from said bendable wall portions, said adjusting means including at least one force exerting means adapted to alter the distance between said flanges, said adjusting means adapted to regulatably bend said bendable wall portions by application of a leverage producing force thereto to alter the cross-sectional configuration of said passage.

* * * * *